United States Patent [19]

Schechter

[11] Patent Number: 4,927,178

[45] Date of Patent: May 22, 1990

[54] INDEXED REFERENCE BOOK

[76] Inventor: Elieser Schechter, 21 Usisshkin St., Jerusalem, Israel

[21] Appl. No.: 259,058

[22] Filed: Oct. 18, 1988

[30] Foreign Application Priority Data

Nov. 1, 1987 [IL] Israel ........................................ 84325

[51] Int. Cl.[5] ...................... B42F 21/00; G09B 19/08; G09B 3/06

[52] U.S. Cl. ........................................ 283/38; 283/36; 283/42

[58] Field of Search ........................ 283/36, 37, 38, 39, 283/40, 41, 42, 43

[56] References Cited

U.S. PATENT DOCUMENTS

| | | | |
|---|---|---|---|
| 813,748 | 2/1906 | Smith . | |
| 1,132,222 | 3/1915 | Smith . | |
| 2,288,066 | 6/1942 | Bloom . | |
| 2,680,630 | 6/1954 | Machol . | |
| 3,473,827 | 10/1969 | Leadbetter . | |
| 3,754,778 | 8/1973 | Lenahan . | |
| 3,817,492 | 6/1974 | Raymer | 283/36 |
| 3,877,729 | 4/1914 | Friedman . | |
| 3,958,816 | 5/1976 | Remmey, III . | |
| 3,995,389 | 12/1976 | Mathis . | |
| 4,175,777 | 11/1979 | Horn . | |
| 4,291,900 | 9/1981 | Feng . | |

FOREIGN PATENT DOCUMENTS

| | | | |
|---|---|---|---|
| 682908 | 6/1966 | Belgium | 283/42 |
| 294390 | 5/1915 | Fed. Rep. of Germany . | |
| 1187224 | 2/1965 | Fed. Rep. of Germany | 283/42 |
| 1147561 | 3/1968 | Fed. Rep. of Germany | 283/42 |
| 922522 | 6/1947 | France | 283/38 |
| 93299 | 2/1959 | Norway | 283/38 |
| 268550 | 9/1950 | Switzerland | 283/42 |
| 373015 | 2/1959 | Switzerland . | |
| 2068839 | 8/1981 | United Kingdom | 283/38 |
| 2110992 | 3/1982 | United Kingdom . | |
| 2187675 | 3/1986 | United Kingdom . | |

*Primary Examiner*—Douglas D. Watts
*Assistant Examiner*—Paul M. Heyrana, Sr.
*Attorney, Agent, or Firm*—Fleit, Jacobson, Cohn, Price, Holman & Stern

[57] ABSTRACT

The invention provides an indexed reference book for rapidly locating words or material arranged in an alphabetical order in the pages of the book comprising a front cover having a plurality of vertical and horizontal lines creating an array of index zones forming rows and columns, each of the index zones bearing indicia corresponding to indicia appearing on different pages of the book, the fore-edge of the pages of the book being marked by tab means, the tab means being arranged along the fore-edge of the book in rows and columns, whereby the tab means of a page bearing specific indicia corresponds in its horizontal positioning on its fore-edge of the book to the index zone bearing the indicica, and the number of tabs in each row corresponds to the number of zones in the same row.

9 Claims, 2 Drawing Sheets

FIG. 2
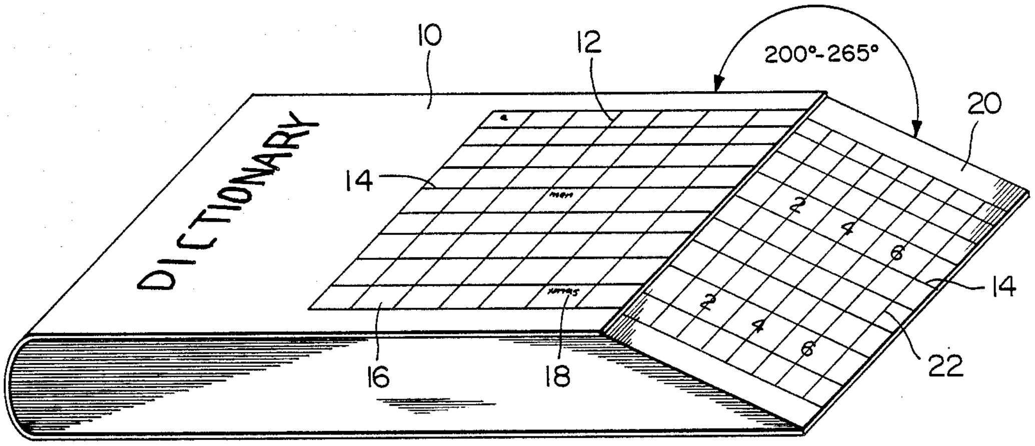
FIG. 3
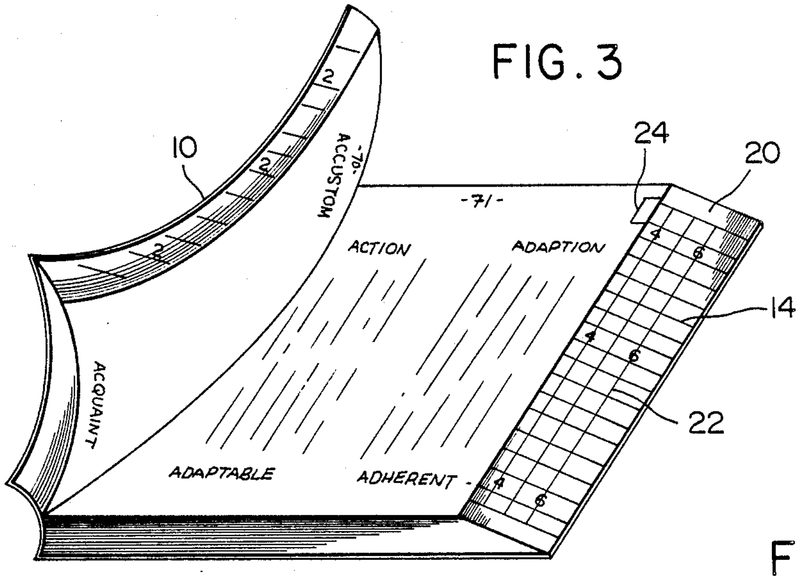
FIG. 4
| Page | Range of Words Starting | Ending |
|---|---|---|
| 1 | a | abhor |
| 2—3 | alarm | amateur |
| 4—5 | baa | baptism |
| 6—7 | bump | by-word |
| 8—9 | commodious | concert |
| 10—11 | daring | deduct |
| 12—13 | dress | dwelt |
| etc. | etc. | etc. |
| 44—45 | vouch | walnut |
| 46—47 | abhorence | abuse |
| 48—49 | amaze | announce |
| 50—51 | baptize | beaver |
| etc. | etc. | etc. |

INDEXED REFERENCE BOOK

The present invention relates to an indexed reference book. More particularly the present invention relates to an indexed reference book for rapidly locating words or material arranged in an alphabetical order in the pages of said book.

When a person looks for a word in a dictionary, the name of a medicine in a catalogue, or an entry in any other type of reference book arranged in a certain order, he must turn the pages. Sometimes he must turn only a few pages, and sometimes many—but turn he must. The object of this invention is to do away with the need for turning pages. In other words, the idea is to produce a tool (a dictionary or reference book) which allows the user to find what he seeks as soon as he opens the book. Thousands of entries can be included in such a book, saving untold time and frustration. While the present invention can be used by well-educated and intelligent persons who also have need to utilize reference books, including doctors referring to a pharma copeia and scrabble players who check their words with a dictionary, this invention is geared mainly for the average student. Such students, both young people and adults, make up the majority of the world's learners.

During his many years as a high school English teacher, the inventor realized how difficult it was for his students to find a word in the dictionary. Moreover, most of them would not do their homework if they were asked to read a text containing 8-10 new words. The invention grew out of this personal experience. Among the difficulties facing the inventor were how to find a quick and easy way of locating the page or entry before opening the book, and how to open it at the correct page. The solution was to design a book which would be printed and bound differently than the norm.

Essentially the solution found is to provide the book with hundreds of tabs, one corresponding to every double page. Many reference books have 400 to 600 pages, and would require 200 to 300 tabs. However, in known configurations, the maximum number of tabs which can reasonably be provided ranges from 14 to 30, these limits being dictated by the arrangement of the recessed finger holds provided, and the limited space available for identifying each tab. Projecting flags are also known for use as tabs, but again a large number of flags will obscure each other unless they are made very small, in which case insufficient room remains on the flag for purposes of identification.

According to the present invention there is now provided an indexed reference book for rapidly locating words or material arranged in an alphabetical order in the pages of said book comprising a front cover having a plurality of vertical and horizontal lines creating an array of index zones forming rows and columns, each of said index zones bearing indicia corresponding to indicia appearing on different pages of said book, the fore-edge of the pages of said book being marked by tab means, said tab means being arranged along the fore-edge of the book in rows and columns, whereby the tab means of a page bearing specific indicia corresponds in its horizontal positioning on its fore-edge of the book to the index zone bearing said indicia, and the number of tabs in each row corresponds to the number of zones in the same row.

In preferred embodiments of the present invention the indicia in said index zones are arranged in alphabetical order from the beginning to the end of a first row and then continuing from the beginning to the end in a subsequent row while the pages bearing indicia corresponding to the indicia contained in two adjacent zones in a row are separated from each other by interposed pairs of facing pages corresponding in number to the number of rows in an index column minus 1.

In especially prefered embodiments of the present invention the number of index zones substantially corresponds to the number of pairs of facing pages in said book.

In order to further facilitate the use of the book of the present invention the fore-edge of said book is preferably cut on a slant so that the edges of each of said tab means in a plan view of said book is viewable and exposed.

Thus preferred results are achieved when the fore-edge of said book diverges from said front cover at an angle of between about 200° and 265°.

Preferably the fore-edge of said book diverges from said front cover at an angle of between about 210° and 250°.

Thus the invention provides an index comprising a matrix displaying at least several of the initial letters of each word appearing first on each pair of facing pages in the book, the edges of each leaf of said book being marked by a tab, each tab corresponding in height position to the matrix row displaying this partial word, and each tab being positioned down the thickness of the book in an order corresponding to the order of the matrix column containing said partial word.

As will be described more fully hereinafter, preferably each index zone column is provided with a different first identifying feature and each column of tabs if provided with a first identifying feature identical to that provided in its associated index zone column.

As will be realized a situation might occur in which the number of pairs of facing pages in the book to be indexed far exceeds the number of index zones which can be practically positioned on the cover index.

This problem is solved by providing an indexed reference book comprising at least one additional index leaf having an array of index zones forming rows and columns as defined hereinbefore, each of said additional index leaves being positioned adjacent a correspondingly tabbed section of said book.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 2 is a perspective view of a reference book according to the invention, when closed;

FIG. 3 is a perspective view of the reference book when open, and

FIG. 4 is a table showing a typical arrangement for the order of pages in a reference book according to the invention.

Figure 1:
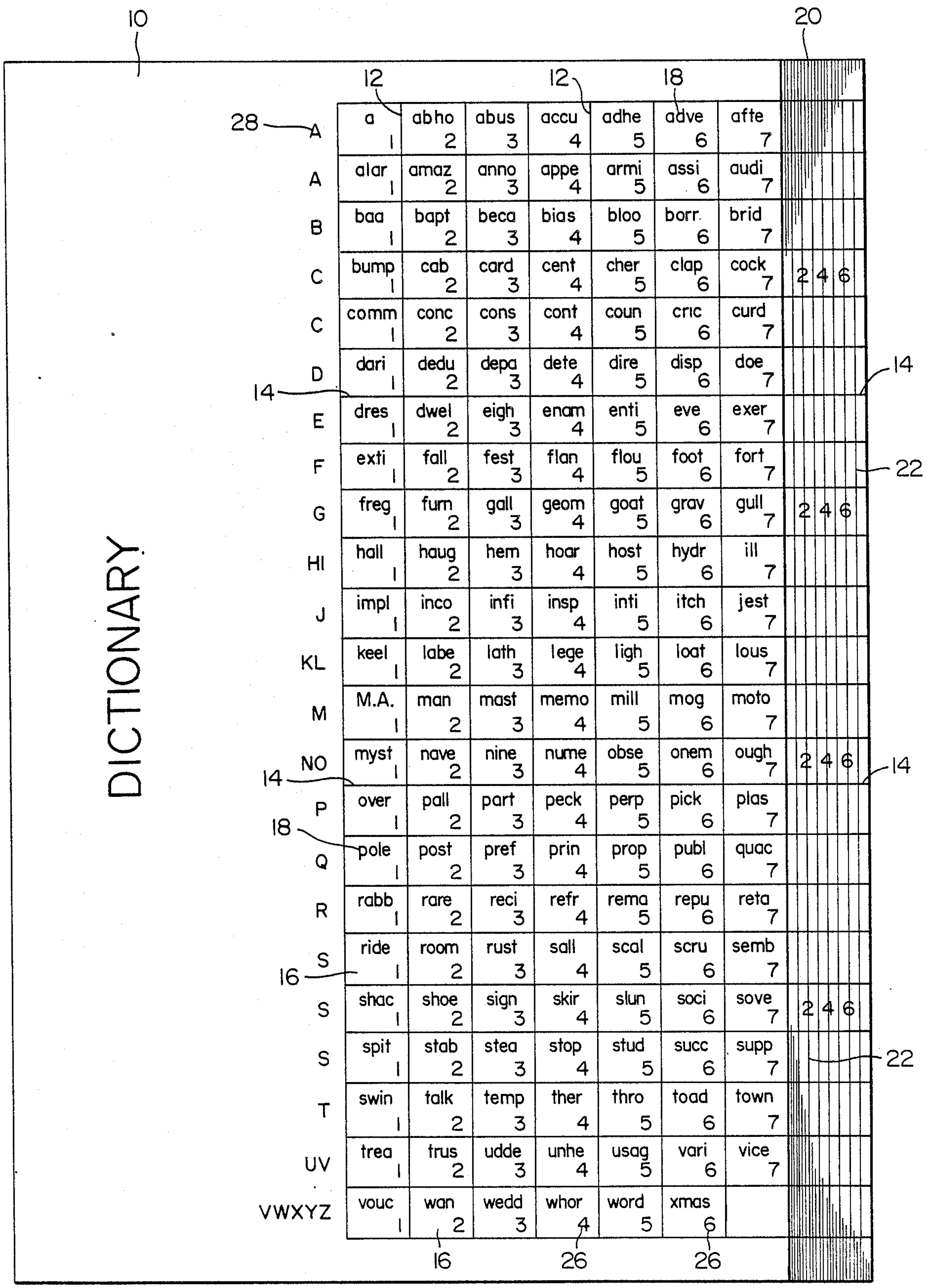
FIG. 1 shows a plan view of a preferred embodiment of the invention.

There is seen in FIG. 1 a plan view of a reference book such as a dictionary. The front cover 10 is printed with vertical lines 12 and horizontal lines 14, whereby an array of index zones in the preferred form of of rectangles 16 in rows and columns is formed. Each rectangle bears at least the initial letters 18 of a word. In a preferred form of the invention the initial letters 18 are arranged in alphabetical order from the left to the right of the first row, continuing to the second row left to right and so on. However, any other orderly arrangement may be used, for example going down the first column, and then down the second column and so on.

The fore-edge 20 of the pages are marked with continuations of horizontal lines 14. A number of nearly vertical lines 22 appear on the fore-edge 20, these lines being formed by the outer edge of tab marks 24, one of which appears on each page and may be seen in FIG. 3. The array thus formed by the lines 14 and tab marks 24 has a similar number of lines 22 as there are columns formed by rectangles 16, and the content of the page carrying tab mark 24 is arranged in an order which will be explained with reference to FIGS. 3 and 4.

Numerals 26 appearing in rectangles 16 relates to similar numerals which appear on lines 22. Letters 28 set up in a column adjacent the index relate to the contents of rectangles 16 and facilitate the rapid location of the row in the index in which the first letter of the desired word is to be found.

Referring now to FIG. 2, the angle between the front cover 10, and the fore-edge 20 of the book may be less than the 270° normally found in books, as shown in exaggerated form in FIG. 2. The advantage achieved by an angle in the range 200°-265° is increased spacing between lines 22, which are formed by tabs 24, thereby easing the task of selecting the tab 24 required. Referring now to FIG. 3, in the embodiment shown the tab 24 comprises a printed rectangle which extends to the very edge of the page. The height and height position of the tab 24 corresponds substantially to the height and height position of the row bearing the partial word 18, which in the example shown is the first row on the double pages 70-71 shown. As in the example, the word accustom is the first word to appear on page 70, and as can be seen in FIG. 1 the partial word accu appears in the first row, therefore, tab 24 appears in line with the first row on page 71. Thus it will be realized that the pages are preferably arranged according to the index and not in alphabetical order.

In a further embodiment of the invention, the tab has the form of a recessed finger grip, or in a further embodiment the form of a projecting flap, the aim being the same in all embodiments—to allow the finger of the user to grip the page corresponding to the indica or partial word 18.

FIG. 4 is a table showing the resultant order of the material printed on the pages of the reference book, in the example given, where 23 rows form 7 columns. Correspondingly, pages 1 to 45 relate to the partial words in the first column. Page 46 carries words from the second column, and the process repeats. The array in the example given therefor will suffice for 23×7 double pages, i.e. 322 pages. Larger numbers of pages can be indexed by the use of an array having more columns, more rows or both. For very substantially larger number of pages, additional index arrays are provided. For example, a reference book having 1300 pages would be provided with an index leaf at the beginning and additional index leaves at or near pages 325, 650 and 975.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An indexed reference book for rapidly locating words or material arranged in an alphabetical order in the pages of said book, said reference book comprising:

front cover means having an array of index zones arranged in rows and columns for bearing identifying indicia, each of said index zones bearing indicia corresponding to indicia appearing on different pages of said book, and the indicia in said index zones being arranged in alphabetical order from a beginning to an end of a first row and then continuing from a beginning to an end in a subsequent row while the pages bearing indicia corresponding to the indicia contained in two adjacent zones in a row are separated from each other by interposed pairs of facing pages, said pairs of pages corresponding in number to the number of rows in an index column minus one, said pages being arranged in an order dictated by the respective index zones rather than in a continuous alphabetical order, a fore-edge of the pages of said book being marked by tab means for identifying a location of indicia, said tab means being arranged along the fore-edge of the book in rows and columns, so that the tab means of a page bearing specific indicia corresponds in its horizontal positioning on the fore-edge of the book to the respective row and column of the index zone bearing said indicia and the number of tabs in each row corresponds to the number of zones in the same row.

2. An indexed reference book according to claim 1, wherein the number of index zones substantially corresponds to a number of pairs of facing pages in said book.

3. An indexed reference book according to claim 1, wherein said book is a dictionary and the indicia are the first letters appearing in a respective word found at the beginning of a pair of facing pages of said book.

4. An indexed reference book according to claim 1, wherein the edges of each of said tab means in a plan view of said book are viewable and exposed.

5. An indexed reference book according to claim 4, wherein the fore-edge of said book diverges from said front cover at an angle of between about 200° and 265°.

6. An indexed reference book according to claim 4, wherein the fore-edge of said book diverges from said front cover at an angle of between about 210° and 250°.

7. An indexed reference book according to claim 1, wherein each index zone column is provided with a different first identifying feature and each column of tab means is provided with a first identifying feature identical to that provided in its associated index zone column.

8. An indexed reference book according to claim 1, wherein the index zones comprise a matrix displaying at least several of the initial letters of each word appearing first on each pair of facing pages in the book, the edges of each leaf of said book being marked by said tab means, each tab means corresponding in height position to the matrix row displaying this partial word, and each tab means being positioned down the thickness of the book in an order corresponding to the order of the matrix column containing said partial word.

9. An indexed reference book according to claim 1, further comprising at least one additional front cover means having an array of index zones forming rows and columns, each of said additional front cover means being positioned adjacent a correspondingly tabbed section of said book.

* * * * *

UNITED STATES PATENT AND TRADEMARK OFFICE
CERTIFICATE OF CORRECTION

PATENT NO. : 4,927,178

DATED : May 22, 1990

INVENTOR(S) : Elieser Schechter

It is certified that error appears in the above-identified patent and that said Letters Patent is hereby corrected as shown below:

ON TITLE PAGE: [76], delete [21 Usisshkin St.] and insert 27 Usisshkin St.

Signed and Sealed this

Tenth Day of March, 1992

*Attest:*

HARRY F. MANBECK, JR.

*Attesting Officer*

*Commissioner of Patents and Trademarks*